United States Patent
Ukon

Patent Number: 5,159,405
Date of Patent: Oct. 27, 1992

[54] MULTIBEAM INTERFEROMETER FOR USE IN A FOURIER TRANSFORM SPECTROMETER AND A DRIVING DEVICE FOR MOVING THE MIRRORS USED THEREIN

[75] Inventor: Juichiro Ukon, Kyoto, Japan

[73] Assignee: Horiba, Ltd., Kyoto, Japan

[21] Appl. No.: 602,858

[22] Filed: Oct. 24, 1990

[30] Foreign Application Priority Data

Oct. 28, 1989 [JP] Japan .............................. 1-126304[U]
Oct. 30, 1989 [JP] Japan .............................. 1-282676[U]

[51] Int. Cl.$^5$ .............................................. G01B 9/02
[52] U.S. Cl. .................................. 356/346; 310/311; 310/348
[58] Field of Search ................ 356/346; 310/311, 330, 310/348, 351, 352, 353, 354, 355

[56] References Cited

U.S. PATENT DOCUMENTS

| | | | |
|---|---|---|---|
| 4,329,055 | 5/1982 | Schaefer et al. | 356/346 |
| 4,435,667 | 3/1982 | Kolm et al. | 310/355 |
| 4,654,530 | 3/1987 | Dybwald | 356/346 |
| 4,681,445 | 7/1987 | Perkins | 356/346 |
| 4,684,255 | 8/1987 | Ford | 356/346 |
| 4,915,502 | 4/1990 | Brierley | 356/346 |

FOREIGN PATENT DOCUMENTS

2906015 8/1979 Fed. Rep. of Germany ...... 356/346
3005520 8/1981 Fed. Rep. of Germany ...... 356/346

*Primary Examiner*—Samuel A. Turner
*Attorney, Agent, or Firm*—Price, Gess & Ubell

[57] ABSTRACT

A swinging member multibeam interferometer for use in a Fourier Transform spectrometer has a pair of mirrors mounted on the swinging member in spaced-apart opposition with the planes of the mirrors being at right angles to the plane of the swinging member. The mirrors may be flat and parallel, flat and skewed with respect to each other, or chevron-shaped with the ends being closer than the middle or the ends being further apart than the middle. A beam splitter directs a reflected beam to one of the pair of mirrors and a transmitted beam to the other of the pair of mirrors. A pair of fixed mirrors reflect both the reflected beam and the transmitted beam back to the mirror pair and a detector. The swinging member is controllably moved by a driving device having a lever connected to a shaft with a piezoelectric ceramic pile supporting said shaft. Contracting and expanding the piezoelectric ceramic pile by electrically energizing means moves the lever and the shaft which is connected to the swinging member.

11 Claims, 8 Drawing Sheets

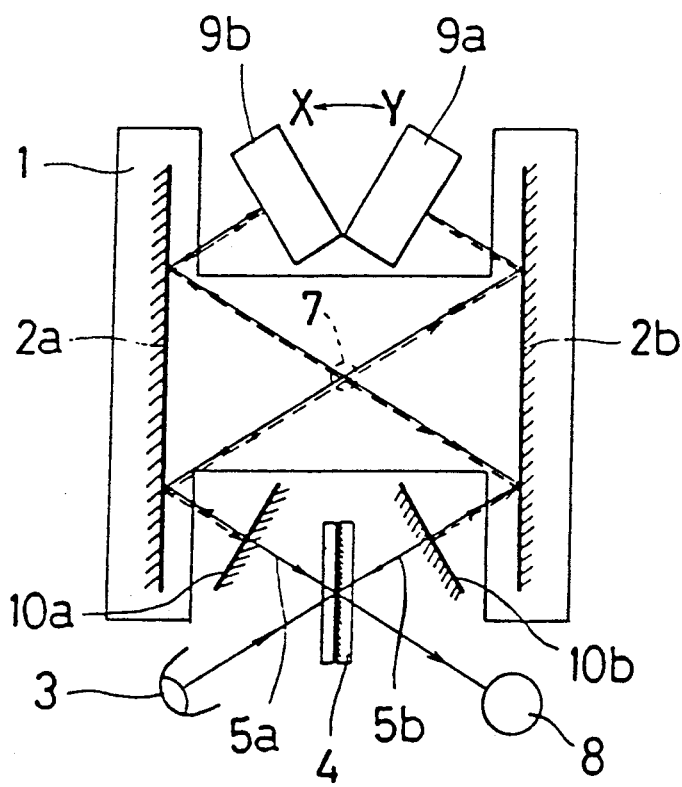
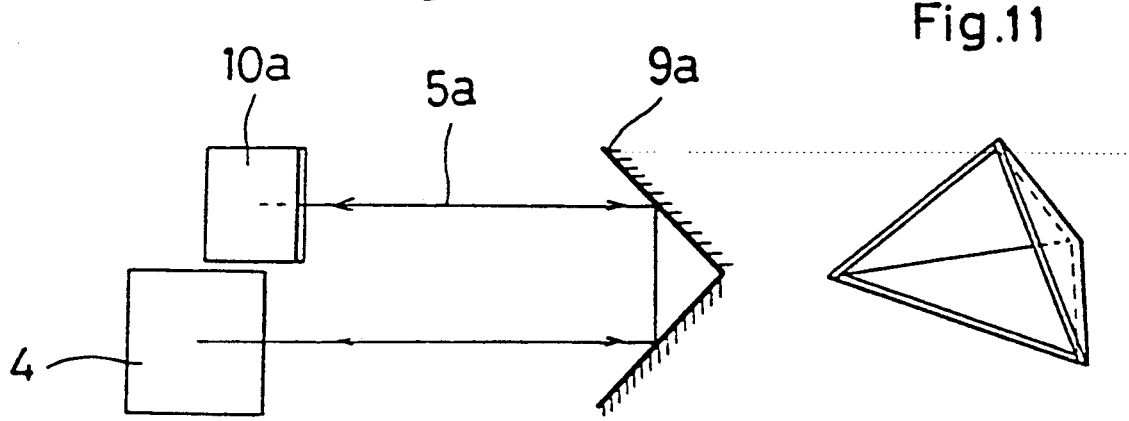

MULTIBEAM INTERFEROMETER FOR USE IN A FOURIER TRANSFORM SPECTROMETER AND A DRIVING DEVICE FOR MOVING THE MIRRORS USED THEREIN

BACKGROUND OF THE INVENTION

1. Field of the Invention

The present invention relates to interferometers used in Fourier Transform spectrometers and driving devices for moving the mirrors therein.

2. Description of Related Art

A multibeam interferometer for use in a Fourier Transform spectrometer such as shown in FIG. 16 has been known.

Referring now to FIG. 16, a light source 51 emits a light beam 68 to a beam splitter 52 which splits the beam, directing a first beam to a fixed flat mirror 53, and a second beam to a movable flat mirror 54. Movable flat mirror 54 is moved back and forth in direction 69, in parallel to the optical axis of the transmitted beam 68.

The fixed flat mirror 53 and the movable flat mirror 54 are arranged so that the angle of incidence for each beam thereupon is 0 degrees, in order to make the optical path of the incident beam almost identical with the optical path of the emitted beam, thereby making the respective beams reflected by the fixed flat mirror 53 and the movable flat mirror 54 equally incident upon the beam splitter 52 again.

With this interferometer, the movable flat mirror 54 is moved linearly 69 in parallel to the optical axis of the incident beam in order to change the optical path length of the beam transmitted from the beam splitter 52. This produces an optical path difference between the incident beam and the reflected beam so that these beams do not arrive at the beam splitter 52 at the same time, and thus cause an interference pattern to occur. The interference pattern is detected at a target 55.

At the same time, it is necessary to provide an angle of inclination for the movable flat mirror 54 that is reduced to 1 degree or less, in order to make the optical axis of the beam incident upon the movable flat mirror 54 almost parallel to the optical axis of the beam emitted from the movable flat mirror 54. A highly accurate air bearing or a parallelogramic linking mechanism has been used as a driving device (not shown) for linearly moving the movable flat mirror 54. The driving device disclosed in Japanese Patent Application Laid-Open No. Sho 63-501174 is one example of such a prior art device.

The driving device disclosed in this publication utilizes a pair of parallel links pivotally mounted on a fixed member at their end portions. A movable flat mirror is mounted on a swinging member pivotally mounted on the other ends of these parallel links. This swinging member is reciprocated by a linear motor to move the movable flat mirror.

Another prior art interferometer is shown in FIG. 17. Referring to FIG. 17, a movable mirror 54A is shown receiving a transmitted beam 70 from a beam splitter 52. The movable mirror is composed of a cube corner mirror comprising three pieces of flat mirror positioned vertically adjacent to each other and moving linearly 71 in parallel to an optical axis of the incident transmitted beam 70. A fixed flat mirror 56 returns the beam incident thereupon from the movable mirror 54a to the movable mirror 54a. Like parts in FIGS. 16 and 17 are designated by the same reference numerals.

In this interferometer, as in the one shown in FIG. 16, the movable mirror 54a is moved linearly to produce a difference in optical path length between the reflected beam and the beam transmitted from the beam splitter 52, so that an interference pattern occurs at beam splitter 52.

The prior art interferometer shown in FIG. 18 is known as an interferometer that does not require a support and guide mechanism for linearly moving a movable flat mirror as required for the structure of FIGS. 16 and 17.

Referring to FIG. 18, a light source 61 directs a beam at a beam splitter 64 mounted on a swinging plate 62. Plate 62 also has a pair of movable flat mirrors 63a, 63b fixedly mounted thereon in parallel with opposing reflecting surfaces, so that the reflecting surfaces are two opposite sides of a parallelogram with the beam splitter 64 fixedly located in parallel with the movable flat mirrors 63a, 63b between the two reflecting surfaces of the flat mirrors 63a, 63b.

The swinging plate 62 is rotatably supported by a supporting shaft (not shown). It is swung, as shown by an arrow 72. The axis of the supporting shaft is arranged in parallel to the surface of the movable flat mirrors 63a, 63b. A fixed flat mirror 65 is located for reflecting a beam, which is incident thereupon from beam splitter 64 through the movable flat mirror 63a, over the same optical path to make the reflected beam incident upon the movable flat mirror 63a again. A fixed flat mirror 66 reflects a transmitted beam, which is incident thereupon from the beam splitter 64, through the same optical path. Reference numeral 67 designates a detector.

With this interferometer, a reflected beam from the beam splitter 64 is reflected by the movable flat mirror 63a and the fixed flat mirror 65 to be incident upon the beam splitter 64 again. A transmitted beam from the beam splitter 64 is reflected by the flat mirror 66 to be incident upon the beam splitter 64 again, but the movable flat mirrors 63a, 63b and the beam splitter 64 are rotatably swung at the same time.

Accordingly, the optical path length from the light source 62 to the flat mirror 65 of the reflected beam is changed to produce a difference between the optical path length of the reflected beam and an optical path length of the transmitted beam having the constant optical path length, so that an interference occurs when they are incident upon the beam splitter 64 again.

In the conventional interferometer of FIG. 16, it is essential that the angle of inclination of the movable mirror 54 be reduced to about 1 degree. Consequently, a highly accurate air bearing or a parallelogram link mechanism has been used as the driving device for the movable flat mirror 54.

If an air bearing is used, it is necessary to provide an air supply. This complicates the operation and makes the apparatus expensive. In addition, it is necessary for the parallelogram link mechanism to move the lengths of the respective opposite sides exactly equal to each other. This requires a high dimensional accuracy for the respective links, causing difficulty in manufacturing such a high accuracy mechanism and increasing the cost of the interferometer. In particular, in prior art mechanisms having a movable flat mirror 54 driven by means of a linear motor, as disclosed in said Japanese Patent Application Laid-Open No. Sho 63-501174, electric power consumption has been high, and the space required for the installation of the driving mechanism is larger than desirable.

Moreover, since every driving device for this application requires a high accuracy, a slight deformation of the respective parts resulting from a temperature change and the like influences the support of the movable flat mirror 54 to change the angle of inclination of flat mirror 54. This increases the shift between a beam incident upon the flat mirror 54 and a beam emitted from the flat mirror 54.

Since the reflected beam and the transmitted beam from the beam splitter 52 travel along different paths, the reflected beam and the transmitted beam pass through spaces that vary in the turbulent condition of air. Accordingly, a difference can be produced between a wave surface of the reflected beam and that of the transmitted beam due to the difference in turbulence of the air. As a result, when the reflected beam and the transmitted beam are rejoined at the beam splitter 52, there is also a greater possibility that the turbulence variation will appear as a noise on an interferogram produced by a Fourier spectrometer.

In the prior art example shown in FIG. 17, since a cube corner mirror 54a is used as the movable mirror, the angle formed between the incident beam and the emitted beam by the inclination of the cube corner mirror produced when it is linearly moved is reduced. Thus, the accuracy required of a driving device for driving the movable mirror is decreased in comparison with that required for the interferometer shown in FIG. 16.

However, a remarkably high accuracy is required of the cube corner mirror 54a used for the movable mirror. That is to say, it is necessary for three pieces of flat mirror to be adjacent to each other while maintaining a completely vertical relationship with a permissible value of a difference in angle in vertical relationship being 1 degree or less. It is difficult to obtain highly accurate cube corner mirrors. A highly accurate cube corner mirror is expense, thereby remarkably raising the cost of an interferometer.

Although a roof-shaped mirror comprising two pieces of flat mirror vertically adjacent to each other acts in the same manner as the cube corner mirror, it also must be manufactured with a high degree of accuracy.

Since the reflected beam and the transmitted beam from the beam splitter 52 passes through difference space, noise resulting from a difference in turbulence of air in the respective spaces occurs in the same manner as in the conventional interferometer shown in FIG. 16.

In the interferometer of FIG. 18, movable flat mirrors 63a, 63b and beam splitter 64 are rotatably swung by means of swinging plate 62. Improving the accuracy of a rotating and supporting mechanism, the shaft, one which the swinging plate 62 moves, is easier than improving the accuracy of the driving device in the interferometers of FIGS. 16 and 17. Thus the cost of the supporting mechanism for the driving device can be reduced. Also, the above-noted problems resulting from use of the linear movement driving devices can almost be solved.

However, in the interferometer of FIG. 18, the movable flat mirrors 63a, 63b and beam splitter 64 are rotatably swung by means of said swinging plate 62 to only change the optical path length of a reflected beam. A problem occurs in this embodiment in that this makes it difficult to increase the difference beam the optical path length of the reflected beam and the transmitted beam. Since the reflected beam and the transmitted beam pass through different space, the problem of noise resulting from different air turbulence in the respective spaces is still present in the same manner as for the conventional interferometers of FIGS. 16 and 17.

Moreover, in the interferometer of FIG. 18, the swinging plate 62 is rotatably swung by means of a servomotor. This causes a high consumption of electric power and requires a larger than desirable space for the installation of the driving device.

The present invention solves the above-described problems in an interferometer, in which movable mirrors are rotatably swung, as shown in FIG. 18.

OBJECTS AND SUMMARY OF THE INVENTION

An object of the present invention is to provide a multibeam interferometer for use in a Fourier Transform spectrometer that can increase the difference in path length between a reflected beam and a transmitted beam and solve the noise problem created by the different air turbulence in the two beam paths.

Another object of the present invention is to provide a driving device for moving flat mirrors with a minimum of power consumption and a minimum space requirement.

These objects and the general purpose of the present invention are obtained by providing a swinging member having a pair of mirrors attached in opposing, spaced-apart relationship. The swinging member is rotated in a plane that meets at right angles with the planes in which the mirrors are fastened. A beam splitter directs a reflected beam to one of the pair of mirrors and a transmitted beam to the other of the pair of mirrors. A pair of fixed mirrors are located to reflect back the reflected beam and the transmitted beam reflected by their respective mirrors, to the beam splitter, through the respective movable mirrors. The movable mirror may be a flat mirror, a roof-shaped mirror comprising two pieces of flat mirror vertically adjacent to each other, a mirror in chevron form having intervals between the respective end portions on the side of the beam splitter and the side of the fixed mirrors larger or smaller than that on the side of a center, a pair of flat mirrors fixedly supported in a mutually inclined manner, or a pair of fixed polygon mirrors comprising a plurality of flat mirrors vertically adjacent to each other. A driving device for moving the mirrors has a lever rotating together with a shaft, a piezoelectric ceramic supporting the lever at a position far from said shaft on the side of a rotating direction of the lever. An energizing means moves the lever toward the piezoelectric ceramic. The movable mirrors are driven by a rotation of the shaft resulting from an expansion and contraction of the piezoelectric ceramic.

BRIEF DESCRIPTION OF THE DRAWINGS

The exact nature of this invention, as well as other objects and advantages thereof, will become readily apparent from consideration of the following specification in conjunction with the accompanying drawings, in which like reference numerals designate like parts throughout the figures thereof, and wherein:

FIG. 9 is a block diagram showing another preferred embodiment;

FIG. 10 is a side view showing a progressive condition of a reflected beam;

FIG. 11 is a perspective view showing one example of a different fixed mirror;

DESCRIPTION OF THE PREFERRED EMBODIMENTS

The preferred embodiments of the present invention will now be described with reference to the drawings.

Figure 1:
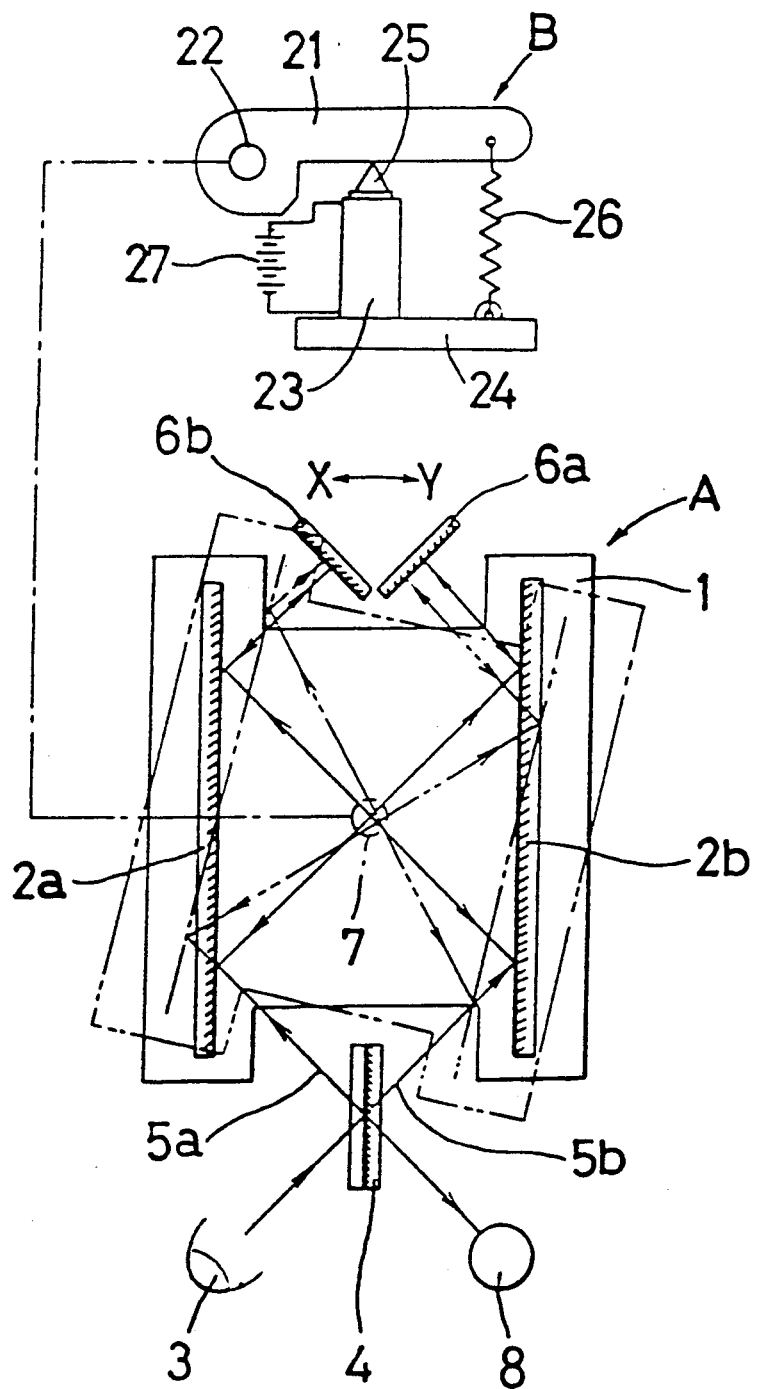
FIG. 1 is a block diagram of a preferred embodiment of the present invention.
Figure 2:
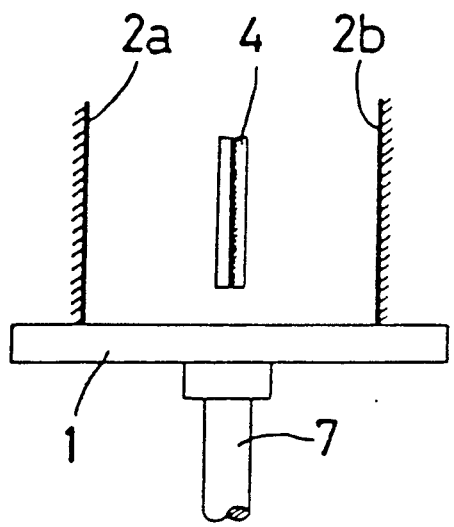
FIG. 2 is a block diagram of FIG. 1 showing a front view.

Referring now to FIGS. 1 and 2, A designates a body of a multibeam interferometer, while B designates a moving device for movable flat mirrors in the interferometer.

The construction of the body of the multibeam interferometer A will be described first. A swinging member 1 formed of a plate material, or the like, is provided with a pair of movable flat mirrors 2a, 2b fixedly attached thereto in opposed, spaced-apart relationship. A light source 3 directs a beam of light to beam splitter 4 for making beams from said light source 3 incident upon movable flat mirrors 2a, 2b. The beam splitter 4 reflects a beam 5a to mirror 2a, and transmits a beam 5b to mirror 2b.

A pair of fixed flat mirrors 6a, 6b reflect the beams from the movable flat mirrors 2a, 2b, respectively. The fixed mirrors 6a, 6b are arranged so that the difference between the angles of incidence of the reflected beam 5a and the transmitted beam 5b may be 0 degrees. The optical axes of the respective beams incident upon and emitted from the fixed mirrors 6a, 6b are almost parallel to each other. The reflected beam 5a and the transmitted beam 5b emitted from the fixed mirrors 6a, 6b are reflected by the movable flat mirrors 2a, 2b to be incident upon the beam splitter 4 again, and then transmitted to a detector 8.

A shaft is fastened to swinging member 1 at its center 7 in a plane that is parallel to the planes of the movable flat mirrors 2a, 2b.

The construction of the driving device B will now be described with reference to FIG. 1. A lever 21 is fixedly mounted on a shaft 22 at one end thereof and rotates together with shaft 22. A piezoelectric ceramic 23 is fixedly mounted on a base 24. Upon applying a voltage to said piezoelectric ceramic 23, it is lengthened in one direction. Piezoelectric ceramic 23 is actually a pile of smaller wafers. A support member 25 is fixedly mounted on top of the piezoelectric ceramic pile 23. Its rounded or pointed end engages one side of lever 21. The shape of the support member 25 may have any of several shapes. That is to say, a flat, a point-like, a curved shape, or the like may be used. It is sufficient that the movement of lever 21 relative to the support member 25 is effected smoothly when the piezoelectric ceramic 23 is extended and contracted so that the movement rotates lever 21.

A spring 26 acts as an energizing means installed between the lever 21 toward the piezoelectric ceramic 23. A power source 27 is connected to the piezoelectric ceramic 23.

Rotation of shaft 22 of the driving device B rotates the movable flat mirrors 2a, 2b together with the swinging member 1 through a shaft 7 by a reciprocal rotation of the shaft 22, as shown by arrow X-Y.

When the swinging member 1 of the multibeam interferometer A is to be rotatably swung by means of the driving device B, the piezoelectric ceramic 23 is extended and contracted by applying a voltage thereto and removing the voltage therefrom. This reciprocally rotates the lever 21 by the force of the ceramic pile 23 in one direction and the force of said spring 26 in the other direction. The lever 21 and the shaft 22, fixedly mounted on the lever 21, are reciprocally rotated together to rotate the swinging member 1 and the movable flat mirrors 2a, 2b mounted thereon.

The movable flat mirrors 2a, 2b are rotatably swung to cause an interference pattern. A beam incident upon the beam splitter 4 from the light source 3 creates a reflected beam 5a which is reflected by the movable flat mirrors 2a, and then 2b, to be incident upon the fixed mirror 6a. It is reflected by the fixed mirror 6a through an optical path almost parallel to the incident optical path. The emitted beam is reflected by the movable flat mirrors 2b, and then 2a, to be incident upon the beam splitter 4 again.

On the other hand, the transmitted beam 5b from the beam splitter 4 is reflected by the movable flat mirrors 2b, and then 2a, to be incident upon the fixed flat mirror 6b. The beam 5b is reflected by the fixed mirror 6b through an optical path almost parallel to the incident optical path. It is reflected by the movable flat mirrors 2a, and then 2b, to be incident upon the beam splitter 4 again.

When the movable flat mirrors 2a, 2b are swung in a direction Y, as shown in dashed lines, the path of travel for the reflected beam 5a is lengthened and that of the transmitted beam 5b is shortened, thereby producing a great difference between the optical path length of the reflected beam 5a and that of the transmitted beam 5b. When the movable flat mirrors 2a, 2b are rotatably swung in an opposite direction, in a direction X as shown by the broken lines, the optical path length of the reflected beam 5a is shortened and that of the transmitted beam 5b is lengthened. Accordingly, when the reflected beam 5a and the transmitted beam 5b, travelling over different optical path lengths, are incident upon the beam splitter 4 again to be joined together, an interference pattern is produced. The joined and interfered beam is converted into a voltage signal in a detector 8.

Figure 18:
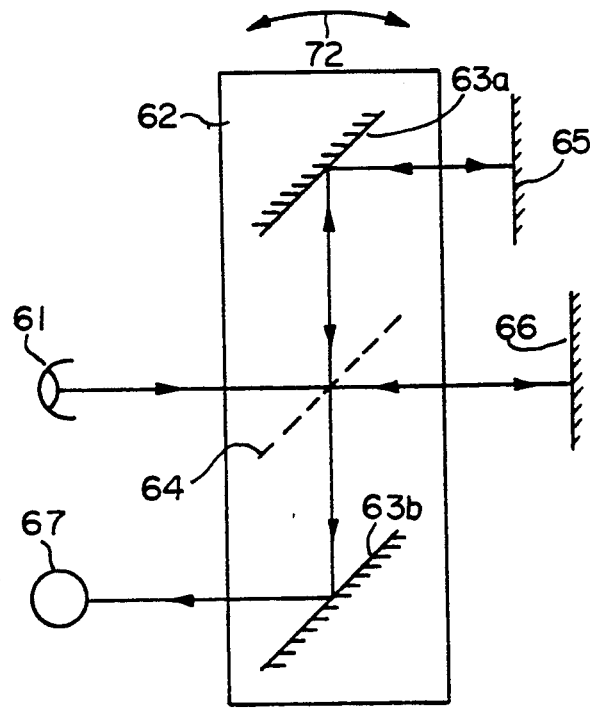
FIG. 18 is a block diagram showing a prior art interferometer.

Since the movable flat mirrors 2a, 2b are rotatably swung at the same time in the above-described manner, the respective optical path lengths of the reflected beam 5a and the transmitted beam 5b are simultaneously lengthened or shortened in an opposite direction, depending upon the swinging direction of the movable flat mirrors 2a, 2b. Accordingly, the difference in optical path length achieved is two times that possible in a conventional interferometer of the type shown in FIG. 18.

In addition, the reflected beam 5a and the transmitted beam 5b pass through almost the same space, the space between the flat mirrors 2a, 2b. That is to say, even though the reflected beam 5a and the transmitted beam 5b pass through a space having air turbulence, both beams simultaneously pass through the same space, thereby experiencing almost the same turbulent condition. Any turbulence effect produced on wave surfaces of the reflected beam 5a and the transmitted beam 5b resulting from air turbulence is almost equal.

When the reflected beam 5a and the transmitted beam 5b are again incident upon the beam splitter 4 to be joined together, the turbulences of the wave surfaces are almost negated. The manifestation of turbulence as noise on an interferogram by the Fourier spectrometer is thus almost completely eliminated.

It is known that if a swinging member 1 is provided with a pair of movable flat mirrors 2a, 2b fixedly attached thereon in opposed parallel relationship, as in the interferometer according to the first preferred embodiment, and a beam incident upon the movable flat mirror 2a is incident upon and emitted from said movable flat mirror 2b, the optical axis of the emitted beam is always parallel, regardless of the angle of swing of the swinging member 1, or whether the shaft 22 of the swinging member 1 is shifted in a radial direction due to shaking or the like.

Accordingly, in this interferometer, the reflected beam 5a and the transmitted beam 5b are reflected by the rotatably swinging movable flat mirrors 2a, 2b and the fixedly arranged fixed mirrors 6a, 6b, in turn, to produce a great difference in optical path length, while still being incident upon the beam splitter 4, to produce an interference pattern.

Moreover, even though the shaft 7 is moved in a radial direction by shaking and the like resulting from an external vibration to this interferometer, the interference pattern between the reflected beam 5a and the transmitted beam 5b is not influenced by this external vibration. Thus, the interferometer can be used at an almost optional place. In addition, since it is not necessary to heighten the accuracy of the support mechanism for the shaft 7, the production and assembly of the support mechanism for the shaft 7 is easy, and thus the cost can be easily reduced.

Figure 3:
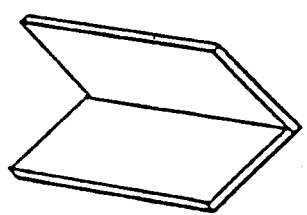
FIG. 3 is a perspective showing one example of a fixed mirror construction.

Although the respective fixed mirrors 6a, 6b are composed of a one-piece flat mirror, a roof-shaped mirror, which comprises two pieces of flat mirror vertically adjacent to each other, as shown in FIG. 3, can be used. In addition, the shaft 7 is arranged at the almost central position of the swinging member 1, but the position of the shaft 7 is optional.

Figure 4:
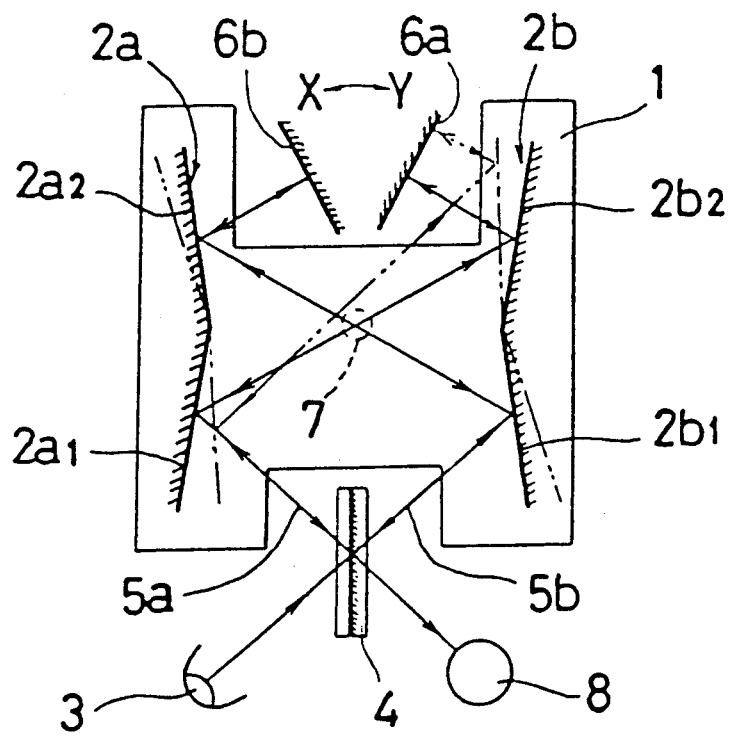
FIG. 4 is a block diagram of another preferred embodiment.

Referring to FIG. 4, reference numeral 1 designates a swinging member provided with a pair of movable mirrors 2a, 2b fixedly attached thereto in parallel opposed relationship. Mirror 2a and mirror 2b are each composed of a pair of flat mirrors $2a_1$, $2a_2$ and $2b_1$, $2b_2$ in a chevron shape, respectively. These mirrors 2a, 2b are arranged so that the spacing between both ends thereof is larger than that between the central area. The flat mirrors $2a_1$, $2b_2$ and the flat mirrors $2b_1$, $2a_2$ have the same inclined direction and are arranged in parallel, respectively.

A light source 3 emits a light beam to a beam splitter 4 for making a pair of beams from said light source 3 incident upon the movable flat mirrors $2a_1$, $2b_1$, respectively. A beam 5a is reflected from beam splitter 4, while beam 5b is transmitted from beam splitter 4.

A pair of fixed mirrors 6a, 6b reflect beam 5a and beam 5b back to the flat mirrors $2a_2$, $2b_2$ of the movable mirrors 2a, 2b, respectively. Fixed mirrors 6a, 6b are composed of one piece of flat mirror. A shaft 7 is attached to the swinging member 1 so that its axis of rotation is in a plane that is parallel to a plane of the movable flat mirror 2a.

A beam from the light source 3 is incident upon the beam splitter 4, a reflected beam 5a reflected by the beam splitter 4, reflected by the movable mirrors 2a, 2b, in this order, to be incident upon and then emitted from the fixed mirror 6a, then reflected by the movable flat mirrors 2a, 2b, in this order, and then again being incident upon the beam splitter 4.

The transmitted beam 5b from the beam splitter 4 is reflected by the movable flat mirrors 2a, 2b, in this order, to be incident upon and then emitted from the fixed mirror 6b, then reflected by the flat mirrors 2a, 2b, in this order, and then again being incident upon the beam splitter 4. The incident transmitted beam 5b is joined together with the reflected beam 5a to produce the interference pattern.

On the other hand, since the movable mirrors 2a, 2b are rotatably swung by the rotatable swing of the swinging member 1, as shown by an arrow X-Y, the respective optical path lengths of the reflected beam 5a and the transmitted beam 5b are lengthened or shortened at the same time in an opposite relationship, depending upon the swinging direction of the swinging member 1, as shown by a broken line, to increase the difference in optical path length.

Besides providing the advantages stated above for the embodiment of FIG. 1, an additional advantage is provided. In this interferometer, the movable mirror 2a is formed of the flat mirrors $2a_1$, $2a_2$, and the movable mirror 2b is formed of the flat mirrors $2b_1$, $2b_2$ in a chevron shape. As a result, the incident angle and an angle of reflection of the reflected beam 5a and the transmitted beam 5b incident upon the flat mirrors $2a_1$, $2b_1$ are smaller than those in the interferometer according to the preferred embodiment of FIG. 1. Accordingly, the size of the interferometer in the direction in which the beam splitter 4 and the fixed flat mirrors 6a, 6b stand side by side can be reduced. Thus the interferometer can be made compact. The roof-shaped mirror shown in FIG. 3 can be used as the fixed flat mirrors 6a, 6b in this embodiment.

Figure 5:
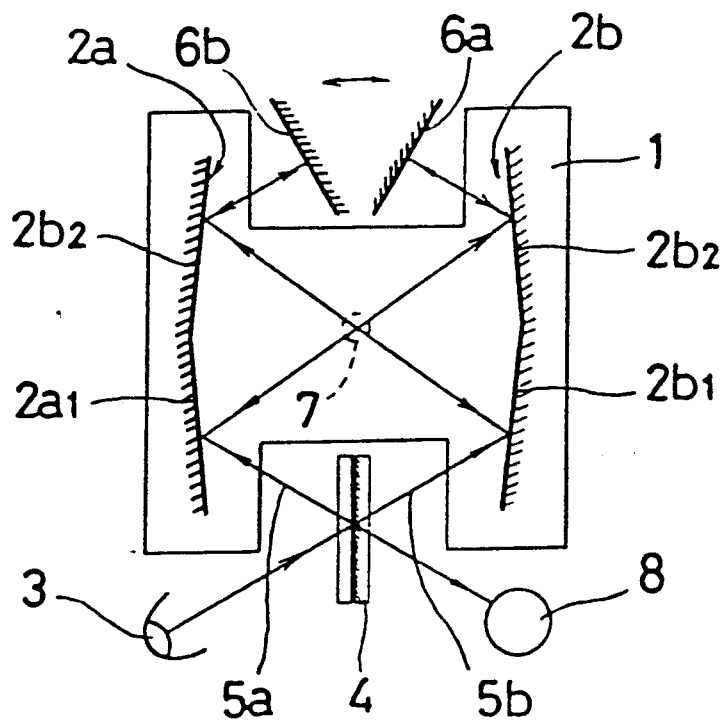
FIG. 5 is a block diagram of another preferred embodiment.

FIG. 5 shows a third preferred embodiment. Also in this third preferred embodiment, respective movable mirrors 2a, 2b fixedly attached to a swinging member 1 are constructed in a chevron shape. Flat mirrors $2a_1$, $2a_2$ and flat mirrors $2b_1$, $2b_2$ composing said movable mirrors 2a, 2b, respectively, are angled opposite to the flat mirrors $2a_1$, $2a_2$, $2b_1$, $2b_2$ in the second preferred embodiment of FIG. 4.

That is to say, the movable mirrors 2a, 2b are constructed so that the space between both ends is smaller than that between the central area. The flat mirrors $2a_1$, $2b_2$ and the flat mirrors $2b_1$, $2a_2$ have the same tilting direction and are parallel to each other, respectively.

Otherwise, the embodiment of FIG. 5 is constructed the same as the preferred embodiment of FIG. 4, with like parts designated by the same reference numerals. The operation of this embodiment is the same as the embodiment of FIG. 4.

Figure 6:
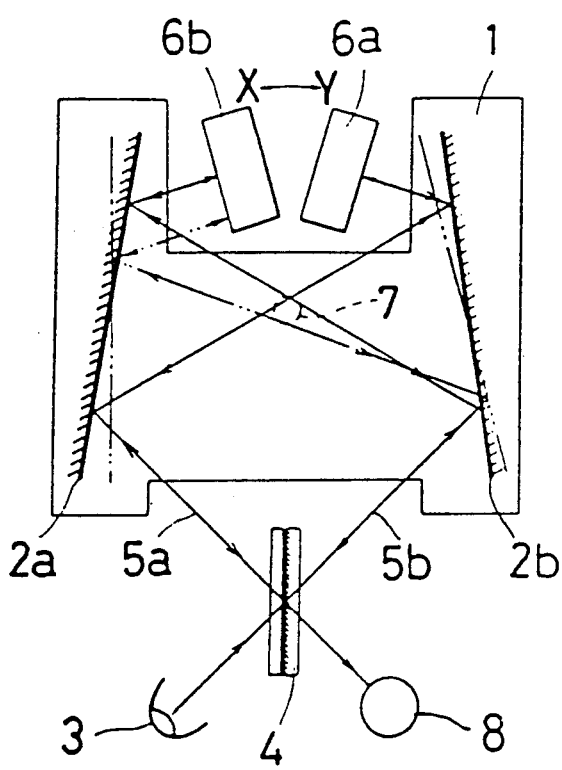
FIG. 6 is a block diagram showing another preferred embodiment.
Figure 7:
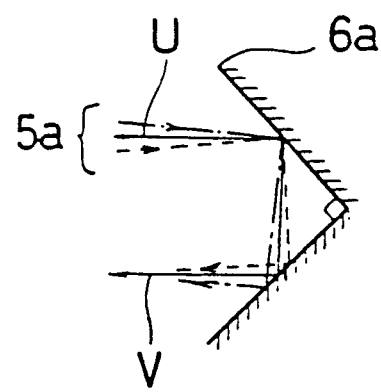
FIG. 7 is a side view showing a fixed mirror.

FIGS. 6 and 7 show another preferred embodiment of the present invention. In this interferometer, a swinging member 1 is provided with movable flat mirrors 2a, 2b fixedly attached thereon in spaced-apart opposition. The movable flat mirrors 2a, 2b are tilted with respect to each other so that the distance between the end portions on the side of a beam splitter 4 is larger than the distance between the ends on the other end.

Fixed mirrors 6a, 6b, which reflect reflected beam 5a and transmitted beam 5b from beam splitter 4 through the movable flat mirrors 2a, 2b, to return them to the beam splitter 4, are preferably constructed as a roof-shaped mirror as shown in FIG. 7. A light source 3 directs a light ray to the mirrors. A shaft 7 is attached to swinging member 1 parallel to the surfaces of the movable flat mirrors 2a, 2b. A detector 8 receives the reflected beams.

This interferometer can be reduced in size in the direction in which the beam splitter 4 and the fixed flat mirrors 6a, 6b stand side by side. The operation of this interferometer is the same as the operation of the interferometer described with reference to FIGS. 1 and 2.

The fixed mirrors 6a, 6b are preferably made as a roof-shaped mirror. They are installed so as to make coincident crest lines thereof with a height of optical axes. As shown for the fixed mirror 6a in FIG. 7, the incident reflected beam 5a is incident upon and then emitted from the opposite other surface, so that a tilting angle of an emitted beam V is the same as that of an incident beam U even though, for example, said shaft 7 shook to tilt said incident beam U, as shown by the broken lines. Accordingly, the emitted beam V can be surely incident upon the beam splitter 4 again through the movable flat mirror 6a. Accordingly, a support mechanism of the shaft 7 is easily produced.

In addition, since the reflected beam 5a and the transmitted beam 5b pass through almost the same space at the same time, the appearance of noise resulting from the air turbulence on the interferogram can be prevented.

Figure 8:
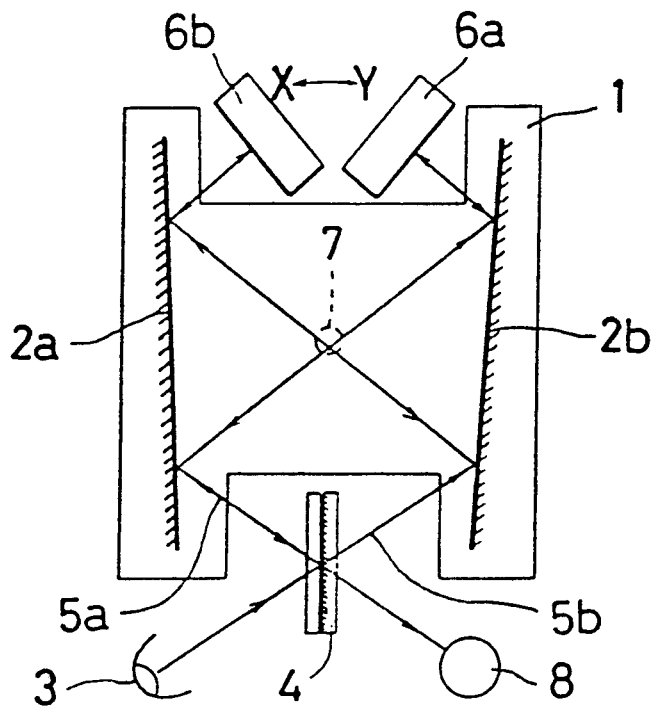
FIG. 8 is a block diagram showing another preferred embodiment.

FIG. 8 shows another preferred embodiment of the invention. In this interferometer, a swinging member 1 is provided with movable flat mirrors 2a, 2b fixedly supported thereon and tilting to each other so that the distance between end portions on the side of a beam splitter 4 is smaller than the distance between the other ends.

All the remaining construction is the same as that in the interferometer of FIG. 6, and like parts are designated by the same reference numerals.

The operation of the interferometer of FIG. 8 is the same as the operation of the interferometer of FIG. 6.

FIGS. 9 and 10 show another preferred embodiment corresponding to the present invention. In this interferometer, a swinging member 1 is provided with a pair of movable mirrors 2a, 2b fixedly supported thereon in parallel spaced opposition. A light source 3 directs a beam of light 4 to a beam splitter 4, making a beam from said light source 3 incident upon said movable mirrors 2a, 2b, a reflected beam 5a, and a transmitted beam 5b.

A pair of fixed polygon mirrors 9a and 9b, composed of a roof-shaped mirror, reflect reflected beam 5a and transmitted beam 5b back toward the movable flat mirrors 2a, 2b on the other surface thereof. The fixed polygon mirrors 9a, 9b, as shown for the fixed polygon mirror 9a in FIG. 10, reflect the beam 5a incident upon one surface of mirror 9a to the other surface of the mirror 9a and then emit from there. The beam incident upon polygon mirror 9a and the beam emitted from the polygon mirror 9a will be different in optical path. The fixed polygon mirrors 9a, 9b are arranged so that the respective optical paths of the beam incident thereupon and the beam emitted therefrom lie side by side.

Reference numerals 10a, 10b designate fixed mirrors composed of one piece of flat mirror. The reflected beam 5a and the transmitted beam 5b are reflected back to the flat mirrors 2a, 2b, to polygon mirrors 9a and 9b, back to flat mirrors 2a, 2b, to be incident again upon the beam splitter 4, and then to detector 8. Fixed mirrors 10, 10b are arranged so as not to overlap on the optical paths of the reflected beam 5a and the transmitted beam 5b emitted from or incident upon the beam splitter 4.

A shaft 7 is provided on swinging member 1 in the same direction as the movable flat mirrors 2a, 2b. The basic construction of this interferometer is the same as the interferometer of FIGS. 1 and 2. That is to say, the swinging member 1 is rotatably swung by a suitable angle of rotation, as shown by an arrow X-Y, to make the reflected beam 5a incident upon the movable flat mirror 2a and the transmitted beam 5b incident upon the movable flat mirror 2b. The reflected beam 5a and the transmitted beam 5b are incident upon the fixed polygon mirrors 9a, 9b through the movable flat mirrors 2a, 2b, and then emitted from the fixed polygon mirrors 9a, 9b through optical paths different from the incident optical paths thereof (refer to FIG. 10).

The reflected beam 5a and the transmitted beam 5b incident upon the fixed mirrors 10a, 10b are returned to the fixed polygon mirrors 9a, 9b through the movable flat mirrors 2a, 2b, and then again incident upon the beam splitter 4 through the movable flat mirrors 2a, 2b. Of the reflected beam 5a and the transmitted beam 5b again incident upon the beam splitter 4, one is increased in optical path length, while the other is reduced in optical path length by the rotational swing of the movable flat mirrors 2a, 2b, so that the union of the reflected beam 5a with the transmitted beam 5b leads to an interference. Thus, an interferogram can be obtained by the rotatable swing of the movable flat mirrors 2a, 2b.

A change in optical path length is produced between the reflected beam 5a and the transmitted beam 5b emitted from the beam splitter 4, and then again incident upon the beam splitter 4 during the time when they are reciprocated two times between the movable flat mirrors 2a, 2b, provided that the swinging angle of the swinging member 1 is the same. This optical path difference is greater by two times that obtainable by the interferometers according to the present invention described so far. Thus, a spectrum showing a higher resolution can be obtained.

Since the optical axes of the beams emitted from the movable flat mirrors 2a, 2b are always almost parallel to each other regardless of the shaking of the shaft 7, the support mechanism for a stable interferometer is easy to make. Here again, the reflected beam 5a and the transmitted beam 5b pass through almost the same space. The problem of noise resulting from air turbulence is negligible.

A cube corner mirror composed of three pieces of flat mirror as shown in FIG. 11 can be used as the fixed polygon mirrors 9a, 9b.

Figure 12:
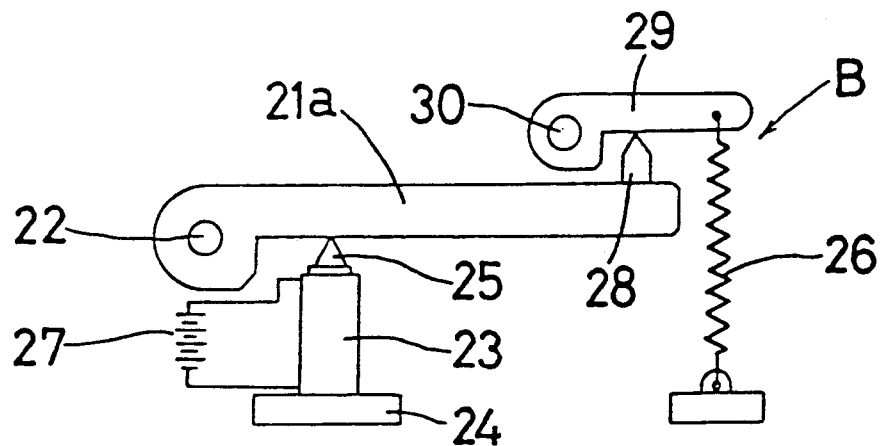
FIG. 12 is a diagrammatic illustration of a preferred embodiment of the moving device according to the present invention.

FIG. 12 shows another preferred embodiment of a driving device B according to the present invention. A first lever 21 is mounted on a shaft 22 at one end thereof. Said first lever 21a is supported on a pointed end of a support member 25 fixedly mounted to the top of a piezoelectric ceramic 23. A base 24 supports the piezoelectric ceramic 23. The first lever 21a and shaft 22 may be fixed to each other and have a rotatable relationship.

A support member 28, having a pointed end, projects from an end of lever 21a. A second lever 29, fixedly mounted on a shaft 30 at one end thereof, is adapted to be rotated together with said shaft 30. Lever 29 is supported on the pointed end of support member 28. It is biased toward the first lever 21a by means of a spring 26. A power source 27 is connected to the piezoelectric ceramic 23.

The shaft 30 of the second lever 29 is directly or indirectly connected with the shaft 7 of the swinging member 1 of the multibeam interferometer shown in FIG. 1. In order to reciprocally rotate the swinging member 1 and the movable flat mirrors mounted thereon by means of driving device B, a voltage is applied to the piezoelectric ceramic 23 to expand the piezoelectric ceramic 23, thereby rotating the first lever 21a. As the support member 25 pushes the first lever 21a, it rotatably pushes the second lever 29 against the force of a spring 26. As a result, the shaft 30 is rotated at the same time.

Subsequently, upon removing voltage from the piezoelectric ceramic 23, the ceramic 23 contracts to the original size, and the spring 26 rotates the second lever 29 and the first lever 21a in an opposite direction. The shaft 30 is rotated at the same time. The movable flat mirrors of the multibeam interferometer are reciprocally rotated by the reciprocal rotation of the shaft 30 resulting from the rotation of the second lever 29.

Since the second lever 29 is swung by swinging the first lever 21a, the rotating distance is increased corresponding to the length of the first lever 21a. The angle of rotation of the second lever 29 and the shaft 30 is thus increased, increasing the swinging angle of the movable flat mirrors of the multibeam interferometer.

Figure 13:
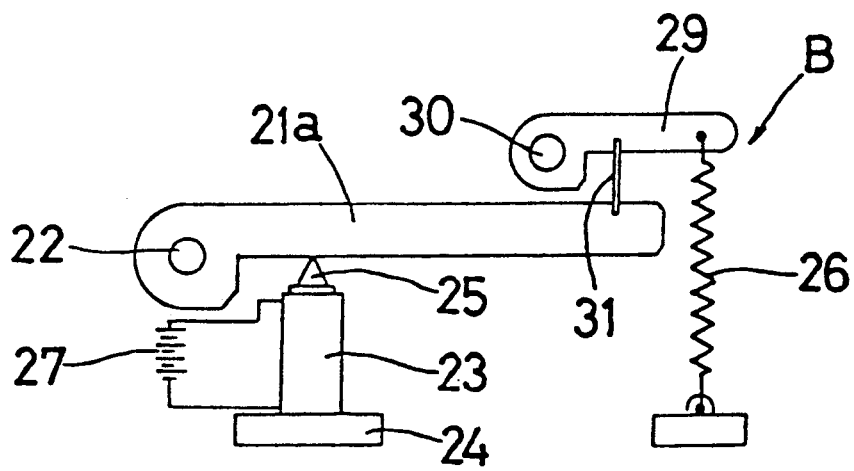
FIG. 13 is a diagrammatic illustration of another preferred embodiment of the moving device.

FIG. 13 shows another preferred embodiment of the driving device B. In this preferred embodiment, a first lever 21a is connected to a second lever 29 through an elastically deformable sheet-like connecting piece 31, such as a plate spring, for example. Since the construction is, for the most part, the same as in the preferred embodiment shown in FIG. 12, all like parts are designated by like reference numerals. In this driving device B, the movable flat mirrors of the multibeam interferometer are reciprocally rotated by means of the shaft 30 in the same manner as in the preferred embodiment of FIG. 12.

Figure 14:
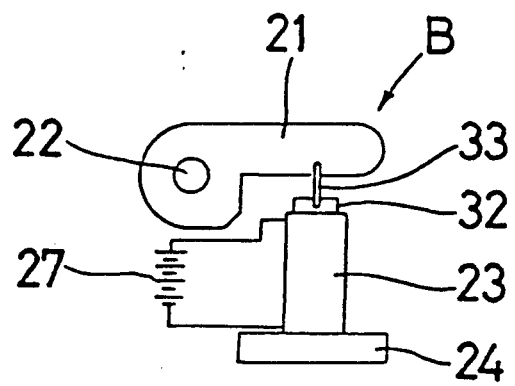
FIG. 14 is a diagrammatic illustration of another preferred embodiment of the moving device.

FIG. 14 shows another preferred embodiment of a driving device B. A lever 21 is fixedly mounted on a shaft 22 at an end portion thereof. A piezoelectric ceramic 23 is fixedly mounted on a base 24. A fitting member 32 is fixedly mounted on a top portion of said piezoelectric ceramic 23. A sheet-like connecting piece 33 formed of a plate spring is fixedly mounted on said fitting member 32 at an end thereof so as to stand on the piezoelectric ceramic 23 in parallel to the direction in which the piezoelectric ceramic 23 stands. The sheet-like connecting piece 33 is fixedly mounted at a position far from the shaft 22 of lever 21, at the other end thereof. A surface thereof is parallel to the axis of shaft 22. The lever 21 is therefore integrally connected with the piezoelectric ceramic 23. A power source 27 is connected to ceramic 23.

In this driving device B, the shaft 22 is directly or indirectly connected with the shaft 7 of the swinging member 1 (FIG. 1). Since the lever 21 is connected to the piezoelectric ceramic 23 through the sheet-like connecting piece 33, upon applying voltage to and removing the voltage from the piezoelectric ceramic 23, the movement of piezoelectric ceramic 23 is directly and immediately transmitted to shaft 22 through the sheet-like connecting piece 33 to reciprocally rotate shaft 22. The movable flat mirrors of the multibeam interferometer are rotated by this rotation of the shaft 22.

Since the sheet-like connecting piece 33 is relatively easily deformed in the direction of thickness but rigid in the direction parallel to a surface thereof, every dislocation of the extension and contraction of the piezoelectric ceramic 23 is immediately and accurately transmitted to the lever 21. Since the dislocation of the lever 21 is absorbed by the elastic deformation of the sheet-like connecting piece 33 in the direction of thickness by the linear extension and contraction of the piezoelectric ceramic 23, the lever 21 can be smoothly rotated by the extension and contraction of the piezoelectric ceramic 23. Accordingly, the movable flat mirrors of the multibeam interferometer can be accurately reciprocally rotated to easily control the optical path difference between the reflected beam and the transmitted beam produced in a unit time constant. The fitting member 32 may be formed integrally with the sheet-like connecting piece 33.

Figure 15:
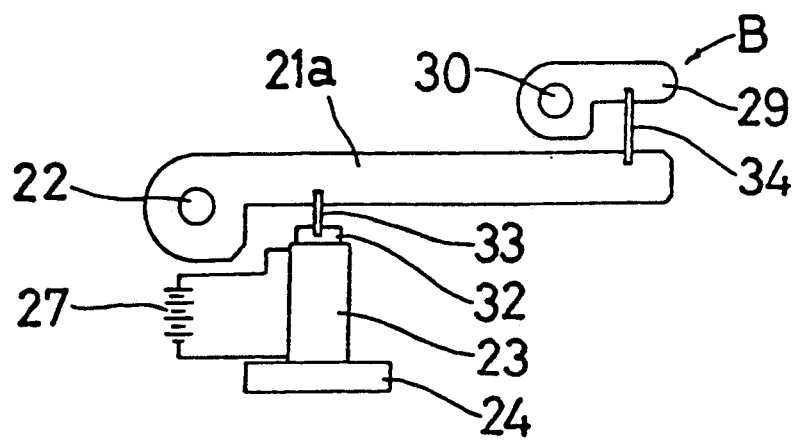
FIG. 15 is a diagrammatic illustration of yet another preferred embodiment of the moving device.
Figure 16:
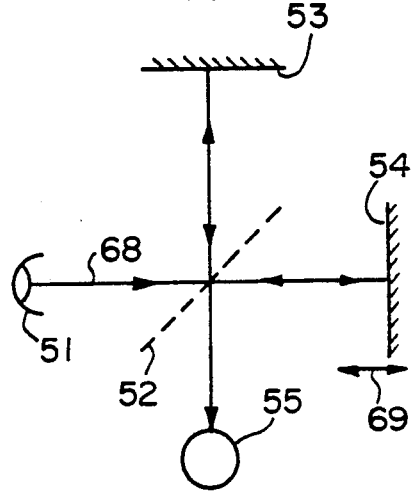
FIG. 16 is a block diagram showing a prior art interferometer.
Figure 17:
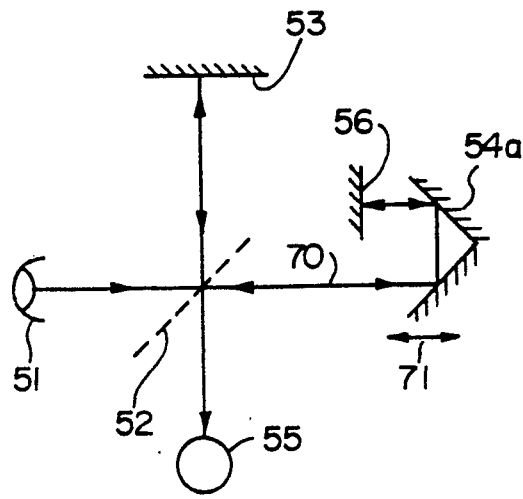
FIG. 17 is a block diagram showing a prior art interferometer.

FIG. 15 shows another preferred embodiment of the driving device B. A first lever 21a is supported on a shaft 22 at one end thereof. A piezoelectric ceramic 23 is fixedly mounted on a base 24. A second lever 29 is fixedly mounted on a shaft 30 at one end thereof. A fitting member 32 is fixedly mounted on a top portion of said piezoelectric ceramic 23 and provided with a first sheet-like connecting piece 33 formed of a plate spring fixedly attached thereto. The first sheet-like connecting piece 33 is fixed at a position far from said shaft 22 at the other end thereof so that a surface thereof may be parallel to the axis of shaft 22.

A second sheet-like connecting piece 34 is formed of a plate spring fixed at a working point of said first lever 21a and a position far from said shaft 30 of said second lever 29 at the respective end portions thereof for connecting the first lever 21a with the second lever 29. A surface of said second sheet-like connecting piece 34 is arranged so as to be parallel to the axis of the shaft 30. A power source 27 is connected to the ceramic 23.

In this driving device B, the movable flat mirrors of the multibeam interferometer are reciprocally rotated by means of the shaft 30 of the second lever 29. In order to rotate the movable flat mirrors of the multibeam interferometer, the piezoelectric ceramic 23 is expanded and contracted to reciprocally rotate the first lever 21a and the second lever 29 at the same time, thereby rotatably swinging the movable flat mirrors (not shown).

The multibeam interferometer for use in the Fourier Transform spectrometer according to the present invention, as described, provides a difference between both optical path lengths that is increased to two times over prior art swinging member devices.

Since the reflected beam and the transmitted beam from the beam splitter pass through the same space between the movable flat mirrors at the same time, turbulence noise on the interferogram by the Fourier spectrometer is reduced to a negligible amount. The precision of the support mechanism for the swinging member need not be highly accurate because of the swinging mirror arrangement. Thus, the cost can be considerably reduced. Moreover, the reflecting mirrors are arranged so that the overall size in the direction in which the beam splitter and the fixed flat mirrors stand side by side can be reduced to make the interferometer much more compact.

In addition, in the interferometer according to the present invention, the difference between the respective optical paths of the reflected beam and the transmitted beam is increased by two times over that of other interferometers. Accordingly, a spectrum exhibiting a much higher resolution can be obtained.

According to the present invention, the driving device consumes very little electric power, and is very compact as a whole. The driving device according to the present invention immediately and surely transmits a moving force to rotate the respective shafts driving the movable flat mirrors in the multibeam interferometer, resulting in a very accurate reciprocal rotation to easily control the optical path difference between the reflected beam and the transmitted beam.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A driving device for movable flat mirrors in a multibeam interferometer for use in a Fourier Transform spectrometer, comprising:
    a lever rotating together with a shaft;
    a piezoelectric ceramic supporting said lever at a position away from said shaft; and
    energizing means for biasing the lever toward said piezoelectric ceramic.

2. A driving device for movable flat mirrors in a multibeam interferometer, comprising:
    a first lever supported by a shaft at a first end;
    a piezoelectric ceramic supporting said first lever at a position away from said shaft;
    a second lever rotatable together with a second shaft and supported by a working point of contact on said first lever at a position away from the second shaft; and
    energizing means for biasing said second lever in a direction towards said first lever and said piezoelectric ceramic.

3. A driving device for movable flat mirrors in a multibeam interferometer, comprising:
    a lever rotating together with a shaft;
    a piezoelectric ceramic disposed at a position away from said shaft; and
    an elastically deformable sheet-like connecting piece fixedly mounted on said lever and said piezoelectric ceramic for connecting the lever to the piezoelectric ceramic, said sheet-like connecting piece being arranged with its flat surface parallel to the axis of said shaft.

4. A driving device for movable flat mirrors in a multibeam interferometer, comprising:
    a first lever supported by a shaft at one end thereof;
    a piezoelectric ceramic disposed at a position away from said shaft;
    a second lever fixedly attached and rotating together with a second shaft in the same direction as the first lever;
    a first elastically deformable sheet-like connecting piece fixedly mounted to the first lever and said piezoelectric ceramic at respective ends thereof for connecting the first lever with the piezoelectric ceramic; and
    a second elastically deformable sheet-like connecting piece fixedly mounted to said first lever and said second lever at respective ends thereof for connecting a working point of the first lever with the second lever, said first and second sheet-like connecting pieces being arranged so that their surfaces are in parallel to the axis of the respective first and second shafts.

5. A driving device for movable flat mirrors in a multibeam interferometer for use in a Fourier Transform spectrometer, comprising:
    a lever rotating together with a shaft;
    a piezoelectric ceramic supporting said lever at a position far from said shaft on the side of a rotating direction of the lever; and
    energizing means for energizing the lever toward said piezoelectric ceramic;
    whereby said movable flat mirrors in said multibeam interferometer are driven by a rotation of the shaft resulting from an expansion and contraction of the piezoelectric ceramic.

6. A driving device for movable flat mirrors in a multibeam interferometer, comprising:
    a first lever supported by a shaft at an end portion thereof;
    a piezoelectric ceramic supporting said first lever at a position far from said shaft on the side of a rotating direction of the first lever;
    a second lever rotatable together with the shaft and supported by a working point of the first lever at a position far from the shaft thereof; and
    energizing means energizing said second lever in a contracting direction of said piezoelectric ceramic;
    whereby the movable flat mirrors in the multibeam interferometer are driven by a rotation of said shaft of the second lever resulting from an expansion and contraction of the piezoelectric ceramic.

7. A driving device for movable flat mirrors in a multibeam interferometer, comprising:
    a lever rotating together with a shaft;
    a piezoelectric ceramic disposed at a position far from said shaft on the side of a rotating direction of said lever;
    an elastically deformable sheet-like connecting piece fixedly mounted on said lever and said piezoelectric ceramic at respective ends thereof for connecting the lever with the piezoelectric ceramic, said sheet-like connecting piece being arranged with a surface thereof in parallel to an axis of the shaft;
    whereby the movable flat mirrors in the multibeam interferometer are driven by a rotation of the shaft resulting from an expansion and contraction of the piezoelectric ceramic.

8. A driving device for movable flat mirrors in a multibeam interferometer, comprising:

a first lever supported by a shaft at an end portion thereof;

a piezoelectric ceramic disposed at a position far from said shaft on the side of a rotating direction of said first lever;

a second lever rotating together with the shaft in the same direction as the first lever;

a first elastically deformable sheet-like connecting piece fixedly mounted on the first lever and said piezoelectric ceramic at respective ends thereof for connecting the first lever with the piezoelectric ceramic; and a second elastically deformable sheet-like connecting piece fixedly mounted on the first lever and said second lever at respective ends thereof for connecting a working point of the first lever with the second lever;

said first and second sheet-like connecting pieces being arranged so that surfaces thereof are in parallel to an axis of the shaft;

whereby the movable flat mirrors in the multibeam interferometer are driven by a rotation of the shaft of the second lever.

9. A multibeam interferometer for use in a Fourier Transformer spectrometer, comprising:

a beam splitter within the path of travel of an inlet beam, said beam splitter dividing the inlet beam into a first beam and a second beam;

a rotatable support member having a first reflecting mirror and a second reflecting mirror substantially rigidly attached thereto in a mutually facing relationship and substantially parallel to the axis of rotation of said support member, said first reflecting mirror and said second reflecting mirror having a chevron profile wherein the distance between the ends of said first and said second reflecting mirror is different than the distance between said first and second reflecting mirrors at their center; and first and second retroreflecting mirrors substantially rigidly disposed within the path of travel of said first and second beams for returning the first and second beams back upon themselves to the beam splitter;

whereby said first beam is reflected from said first reflecting mirror to said second reflecting mirror, and from said second reflecting mirror to said second retroreflecting mirror, and whereby said second beam is reflected from said second reflecting mirror to said first reflecting mirror, and from said first reflecting mirror to said first retroreflecting mirror.

10. The multi beam interferometer of claim 9 wherein the distance between the ends of said first and said second reflecting mirrors is greater than the distance between said first and second reflecting mirror at their center; and wherein said first and second retroreflecting mirrors are located with respect to each other and with respect to said beam splitter so that the ends of said first and second retroreflecting mirrors closest to said beam splitter are closer together than the ends of said first and second retroreflecting mirror further away from said beam splitter.

11. The multibeam interferometer of claim 9 wherein the distance between the ends of said first and second reflecting mirrors is less than the distance between said first and second reflecting mirror at the center; and wherein said first and second retroreflecting mirrors are located with respect to each other and with respect to said beam splitter so that the ends of said first and second retroreflecting mirrors closest to said beam splitter are closer together than the ends of said first and second retroreflecting mirror further away from said beam splitter.

* * * * *